US008031921B2

(12) United States Patent
Manduca et al.

(10) Patent No.: US 8,031,921 B2
(45) Date of Patent: Oct. 4, 2011

(54) ELECTRONIC STOOL SUBTRACTION IN CT COLONOGRAPHY

(75) Inventors: Armando Manduca, Rochester, MN (US); Michael J. Carston, Rochester, MN (US); Robert J. Wentz, Rochester, MN (US); C. Daniel Johnson, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 803 days.

(21) Appl. No.: 11/816,264

(22) PCT Filed: Feb. 14, 2006

(86) PCT No.: PCT/US2006/005087
§ 371 (c)(1),
(2), (4) Date: May 23, 2008

(87) PCT Pub. No.: WO2007/030132
PCT Pub. Date: Mar. 15, 2007

(65) Prior Publication Data
US 2008/0273781 A1    Nov. 6, 2008

Related U.S. Application Data

(60) Provisional application No. 60/652,679, filed on Feb. 14, 2005.

(51) Int. Cl.
*G06K 9/00*    (2006.01)
(52) U.S. Cl. .................. 382/128; 382/130; 345/424
(58) Field of Classification Search .................. 382/128, 382/130–132, 154, 163, 194, 195, 283; 345/424
See application file for complete search history.

(56) References Cited

U.S. PATENT DOCUMENTS

| 3,915,152 A | 10/1975 | Colonna |
| 4,630,203 A | 12/1986 | Szirtes |
| (Continued) | | |

FOREIGN PATENT DOCUMENTS
WO    9730736    8/1997
(Continued)

OTHER PUBLICATIONS

International Search Report and Written Opinion of International Application No. PCT/US06/05087, both mailed Sep. 21, 2007.
(Continued)

*Primary Examiner* — Louis Arana
(74) *Attorney, Agent, or Firm* — Faegre & Benson LLP

(57) ABSTRACT

A method for processing CT colonography input image voxel data representative of 3-dimensional images of a colon having gas and stool tagged with stool tagging agent, to remove the stool from the images. The input voxel data is generated by an imaging instrument having a characteristic point spread function representative of instrument blurring. The point spread function of the instrument can be empirically determined, and the image data processed as a function of the point spread function to accurately identify and remove the tagged stool. In one embodiment of the invention, portions of the image data representative of the tagged stool and colon tissue are dilated as a function of the point spread function. In another embodiment, portions of the image data representative of the tagged stool are convolved with the point spread function to determine the fractional amount of stool present in the image portions, and the tagged stool subtracted by reducing the intensities of the associated portions of the image by an amount proportional to the fractional amount of stool present.

24 Claims, 3 Drawing Sheets

U.S. PATENT DOCUMENTS

| | | | |
|---|---|---|---|
| 4,939,646 A | 7/1990 | Essinger et al. | |
| 5,170,170 A | 12/1992 | Soumekh | |
| 5,178,150 A | 1/1993 | Silverstein | |
| 5,322,070 A | 6/1994 | Goodman et al. | |
| 5,323,111 A | 6/1994 | Suzuki | |
| 5,361,763 A | 11/1994 | Kao et al. | |
| 5,368,033 A | 11/1994 | Moshfeghi | |
| 5,458,111 A | 10/1995 | Coin | |
| 5,574,763 A | 11/1996 | Dehner | |
| 5,662,113 A | 9/1997 | Liu | |
| 5,699,799 A | 12/1997 | Xu et al. | |
| 5,782,762 A | 7/1998 | Vining | |
| 5,859,891 A | 1/1999 | Hibbard | |
| 5,891,030 A | 4/1999 | Johnson et al. | |
| 5,920,319 A | 7/1999 | Vining et al. | |
| 5,971,767 A | 10/1999 | Kaufman et al. | |
| 6,059,729 A | 5/2000 | Stonger | |
| 6,083,162 A | 7/2000 | Vining | |
| 6,331,116 B1 | 12/2001 | Kaufman et al. | |
| 6,477,401 B1 | 11/2002 | Johnson et al. | |
| 6,947,784 B2 | 9/2005 | Zalis | |
| 7,035,681 B2 | 4/2006 | Johnson et al. | |
| 7,454,044 B2 * | 11/2008 | Truyen et al. | 382/128 |
| 7,953,263 B2 * | 5/2011 | Okamoto et al. | 382/128 |
| 2006/0187221 A1 * | 8/2006 | Lakare et al. | 345/424 |

FOREIGN PATENT DOCUMENTS

| | | |
|---|---|---|
| WO | 9832371 | 7/1998 |
| WO | 0178017 | 10/2001 |
| WO | 2005101314 | 10/2005 |

OTHER PUBLICATIONS

Carston, Michael J. et al., "CT colonography of the unprepared colon: An evaluation of electronic stool subtraction," Mayo Clinic College of Medicine, Rochester, MN.

Zalis, Michael E. et al., "Digital Subtraction Bowel Cleansing for CT Colonography Using Morphological and Linear Filtration Methods," IEEE Transactons on Medical Imaging, vol. 23, No. 11, Nov. 2004.

A probabilistic method for virtual colonoscopy cleansing; Iwo Serlie, et al.; Department of Applied Physics, Delft University of Technology, Lorenzweg, The Netherlands, et al.

Lakare, Sarang et al., "Robust Colon Residue Detection Using Vector Quantization Based Classification for Virtual Colonoscopy," Department of Computer Science and Radiology, Stony Brook University, Stony Brook, NY.

Dachman, Abraham H., James Lieberman, Robert B. Osnis, Shiuh-Yung J. Chen, Kenneth R. Hoffmann, Chin-Tu Chen, Geraldine M. Newmark and James McGill, "Small Simulated Polyps in Pig Colon: Sensitivity of CT Virtual Colography", Radiology, v. 203, pp. 427-430 May 1997.

Erickson, Deborah, "Colonic Gold: Simulated flights through patients' bowels may one day permit widespread screening without scoping", Physicians Weekly, Jun. 26, 1995.

GE Medical Systems, "Advantage Windows: Diagnostic Workstation" (brochure). before filing date, Jan. 27, 1997.

Haney, Daniel Q., "Simpler Colon Test Reported, X-rays: computers are linked for inside view without tube", The Plain Dealer, p. 8-A, Mar. 28, 1995.

Hara, A.K., C.D. Johnson, J.E. Reed, D.A. Ahlquist, H. Nelson, R.L. Ehman and W.S. Harmsen, "Reducing Data Size and Radiation Dose for CT Colonography", American Journal of Radiology, v. 168, pp. 1181-1184, May 1997.

Hara, Amy K., C. Daniel Johnson, Judd E. Reed, Richard L. Ehman, and Duane M. Ilstrup, "Colorectal Polyp Detection Using Computed Tomographic Colography: 2D Versus 3D Techniques", Radiology, v. 200, No. 1 pp. 49-54, Jul. 1996.

Hara, Amy, C. Daniel Johnson, Judd E. Reed, David A. Ahlquist, Heidi Nelson, Richard L. Ehman, Cynthia H. McCollough, and Duane M. Ilstrup, "Detection of Colorectal Polyps by Computed Tomographic Colography: Feasibility of a Novel Technique", Gastroenterology, v. 110, pp. 284-290. Before Filing Date, 1996.

Ogura, T., K. Koizumi, S. Kai and M. Maruyama, Three-Dimensional CT Colonscopy: Comparison with Colonscopy and Barium Enema Examination, Scientific Exhibits, Radiology of North America, Nov. 1995.

Reed, Judd E, Amy K. Hara and C. Daniel Johnson, "Interpretation of Image Sets Containing Convoluted Tubular Structures Via Transluminal Sections and Steerable Intraluminal Perspective Views", Proceedings of International Society for Optical Engineering, v. 710, pp. 1109-1019, Feb. 1996.

Riotto, Mark,"Virtual Reality Provides a Closer Look at Colon", Radiology Today, p. 11, Jul. 1994.

Rubin, Geoffrey D., Christopher F. Beaulieu, Vincent Argiro, Helmut Ringl, Alexander M. Norbash, John F. Feller, Michael D. Dake, R. Brooke Jeffrey, and Sandy Napel, "Perspective Volume Rendering of CT and MR Images: Applications for Endoscopic Imaging", Radiology, v. 199, pp. 321-330. Before filing date, 1996.

Vining, David J., Barbara Vanderwerken, Elizabeth Teigen, Wallace Wu, David Gelfand, "Update of Virtual Colonoscopy" The Society of Gastrointestinal Radiologists, Twenty-Fifth Annual Meeting and Postgraduate Course, Mar. 24-29, 1996.

Vining, D.J. K. Lui, P.F. Helmer,and D. Ahn, "Principles of Virtual Reality Imaging", Scientific Exhibits, Radiology Society of North America, Nov. 1995.

Vining, David J., and David W. Gelfand, "Noninvasive Colonoscopy Using Helical CT Scanning, 3D Reconstruction, and Virtual Reality", Society of Radiologists, Feb. 1994.

Vining, D.J., and E.L. Teigen, "Experience with Virtual Colonoscopy in 20 Patients", Scientific Exhibits, Radiology Society of North America, Nov. 1995.

Vining, D.J., R.Y. Shifrin, E.K. Grishaw, K. Liu and D.W. Gelfand, "Virtual Colonscopy", Radiology Society of North America (RSNA) v. 193, p. 446. Before Filing Date, 1994.

Vining, David J., Ronald J. Zagoria, Kun Liu and David Stelts, "CT Cystoscopy: An Innovation in Bladder Imaging", American Journal of Radiology, v. 166 pp. 409-410, Aug. 2, 1995.

Woodhouse, C.E. and J.L. Friedman, "In Vitro Air-Contrast-enhanced Spiral 3D CT (Virtual Coloscopy) Appearance of Colonic Lesions", Scientific Exhibits, Radiology Society of North America, Nov. 1995.

Wang, Ge and Michael W. Vannier, "GI Tract Unraveling by Spiral CT", SPIE, vol. 2434 pp. 307-315. Before filed, Jan. 27, 1997.

Zeiberg, Andrew S., Paul M. Silverman, Roy B. Sessions, Thomas R. Troost, William J. Davros, and Robert K. Zeman, "Helical (Spiral) CT of the Upper Airway with Three-Dimensional Imaging: Technique and Clinical Assessment", American Roentgen Ray Society, v. 166, pp. 293-299, Feb. 1996.

\* cited by examiner

Fig. 3A
Fig. 3B

Fig. 4A
Fig. 4B
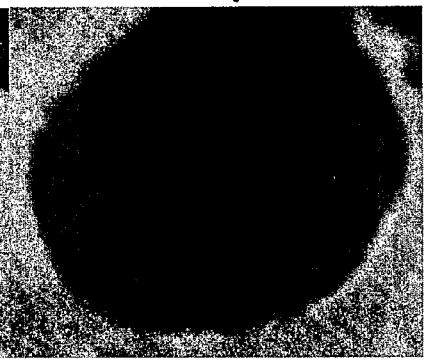
Fig. 5A
Fig. 5B
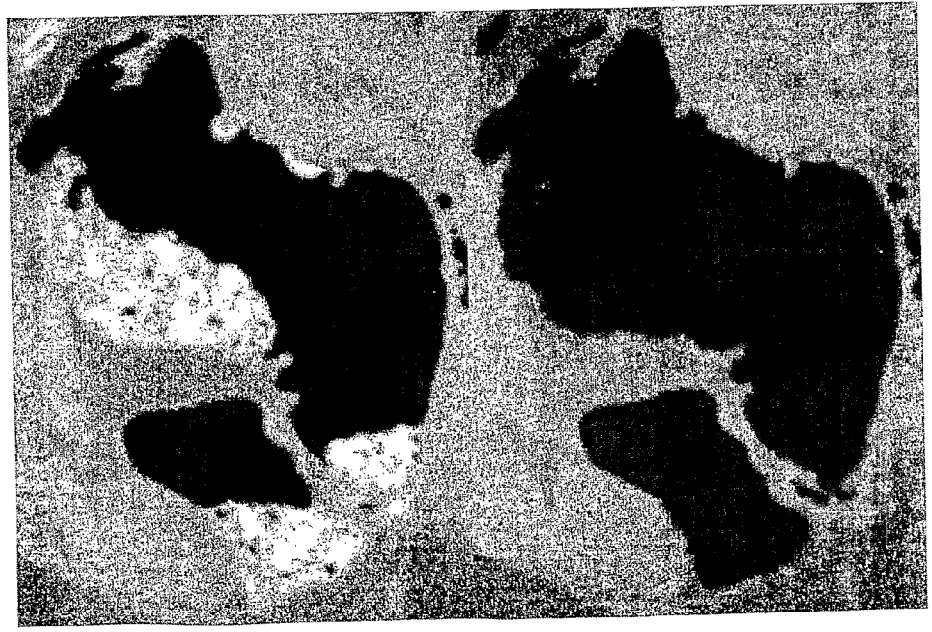

ELECTRONIC STOOL SUBTRACTION IN CT COLONOGRAPHY

REFERENCE TO RELATED APPLICATION

This application claims the benefit of U.S. Provisional Application Ser. No. 60/652,679, filed on Feb. 14, 2005 and entitled Electronic Stool Subtraction Algorithm For CT Colonography Without Bowel Preparation, which is incorporated herein by reference in its entirety.

GOVERNMENT LICENSE RIGHTS

This invention was made with funding support from the U.S. government under Government Contract No. NIH-R01 CA 75333. The U.S. government has certain rights to this invention.

FIELD OF THE INVENTION

This invention relates generally to the field of CT colonography. In particular, the invention is a method for electronically identifying and removing stool from CT colonography images.

BACKGROUND OF THE INVENTION

Colonography, the use of electronic imaging technologies such as computed tomography (CT) to generate images of a patient's colon for purposes of colorectal cancer screening, is generally known. Descriptions of this diagnostic methodology can, for example, be found in the following U.S. patents, all of which are incorporated herein by reference.

| Inventor | U.S. Pat. No. |
| --- | --- |
| Vining | 5,782,762 |
| Johnson et al. | 5,891,030 |
| Vining et al. | 5,920,319 |
| Kaufman et al. | 6,331,116 |
| Johnson et al. | 6,477,401 |
| Zalis | 6,947,784 |

Briefly, this methodology involves obtaining a series of CT images of adjacent portions or slices of the colon. A radiologist then studies each of the images to identify any precancerous polyps. Also known as virtual colonoscopy, this technique effectively creates a computer simulated intraluminal flight through the colon. This dynamic diagnostic methodology has been demonstrated to be a highly efficacious approach for detecting colorectal polyps.

Although these known colonography approaches are generally much less invasive and more comfortable for the patient that other colorectal cancer screening techniques such as colonoscopy, they sometimes require that the patient's colon be prepared (i.e., cleansed of stool) through the use of laxatives or other cathartics. Removal of the stool is required because the stool exhibits the same density to the imaging processes as the polyps and soft colon tissue. In other words, the stool looks very similar to polyps and the tissues of the colon in the colonography images. The presence of residual stool and fluid can therefore mask polyps and other features in the images that may be relevant to the diagnostic process. Unfortunately, these colon preparation processes can be time consuming and uncomfortable for the patient. Patient compliance with the preparation processes is sometimes poor, resulting in reduced efficacy of the diagnostic procedure. Perhaps even worse, some patients may forego the diagnostic procedure altogether to avoid the inconvenience of the preparation process.

It is known to tag stool with an opacifying agent such as barium prior to CT colonography imaging. The marked or tagged residual stool and fluid is then brighter than soft tissue in the images and recognizable. The tagged stool can also be electronically identified and subtracted from the images. However, accurate stool subtraction is difficult for several reasons. Stool is rarely perfectly labeled, and it is heterogeneous and can contain air pockets with low intensity values. Stool boundaries are also irregular and unpredictable, and partial volume (blurring) effects between stool and air and between stool and tissue will create pixels with intermediate values that are hard to recognize. Furthermore, the effects of noise vary between patients, and can alter voxel intensities significantly.

Stool subtraction after what could be considered partial preparation of the colon is also known. By these techniques the materials ingested by the patient cause the residual stool to be fluid. This generally makes the stool subtraction process easier, since the stool labeling is more homogeneous and the stool-air boundary is generally linear. Unfortunately this preparation approach results in some amount of discomfort and inconvenience to the patient and, possibly, reduced compliance. Accurate stool subtraction on an unprepared colon is typically more difficult.

There is, therefore, a continuing need for improved colonography methodologies. In particular, there is always room for image processing methodologies capable of more accurately identifying and removing residual stool from the images. A methodology enabling improved and accurate stool subtraction on an unprepared colon would be especially desirable. To be viable, any such method should also be efficient to implement. A method that meets these objectives can enhance patient acceptance of the diagnostic procedure, enhance the likelihood of diagnostic accuracy, and thereby reduce the morbidity of colorectal cancer.

SUMMARY OF THE INVENTION

The present invention is an accurate and efficient-to-implement method for electronically removing stool from colonography images. The data processing method effectively estimates the fraction of stool present at each voxel. The stool removal process estimates partial volume and system blur effects for each voxel by attempting to emulate certain aspects of the image acquisition process.

One embodiment of the invention includes the following steps a-j for processing input image voxel data representative of 3-dimensional images of a colon having gas and stool tagged with stool tagging agent. The input image voxel data is generated by an imaging instrument having a point spread function. At step a the voxels are classified into one of a plurality of class masks including tagged stool, gas, tissue and unknown substance masks as a function of the intensities and gradients of the voxels. At step b an attempt is made to reclassify at least some of the voxels in the unknown substance mask into one or more of the tagged stool, gas and tissue masks as a function of the classification of adjacent voxels. Step c is performed after step b, and includes attempting to reclassify at least some of the voxels in the unknown substance mask into the tagged stool mask if the voxels in the unknown substance mask are surrounded by voxels in the tagged stool mask. Step d is performed after step c, and includes attempting to reclassify at least some of the voxels in the unknown substance mask into the tagged stool mask as a function of the intensities of the voxels in the unknown substance mask. Step e is performed after step d and includes repeating step b. Step f is performed after step e and includes repeating step c. Step g is performed after step f, and includes dilating the tagged stool, gas and tissue masks as a function of the point spread function of the instrument. Step h is performed after step g and includes reclassifying voxels of the tagged stool mask that overlap with voxels in the tissue mask into the tissue mask. Step i, performed after step h, includes convolving the voxels in the tagged stool mask with the point spread function of the instrument to generate an estimate of the contribution to the intensity due to stool in each voxel of the image. At step j the intensities of voxels in the input image voxel data are reduced as a function of the stool amount estimates generated in step i.

Another embodiment of the invention is a method for processing input image voxel data representative of 3-dimensional images of a colon having gas and stool tagged with stool tagging agent to remove the stool from the images. The input image voxel data is generated by an imaging instrument having a point spread function. The method includes processing the data as a function of the point spread function of the instrument.

BRIEF DESCRIPTION OF THE DRAWINGS

FIGS. 3A and 3B are images of a portion of a colon before and after residual stool was identified and removed by the method of the present invention.

FIGS. 4A and 4B are images of another portion of a colon before and after residual stool was identified and removed by the method of the present invention.

FIGS. 5A and 5B are images of yet another portion of a colon before and after residual stool was identified and removed by the method of the present invention.

DETAILED DESCRIPTION OF THE PREFERRED EMBODIMENTS

Figure 1:
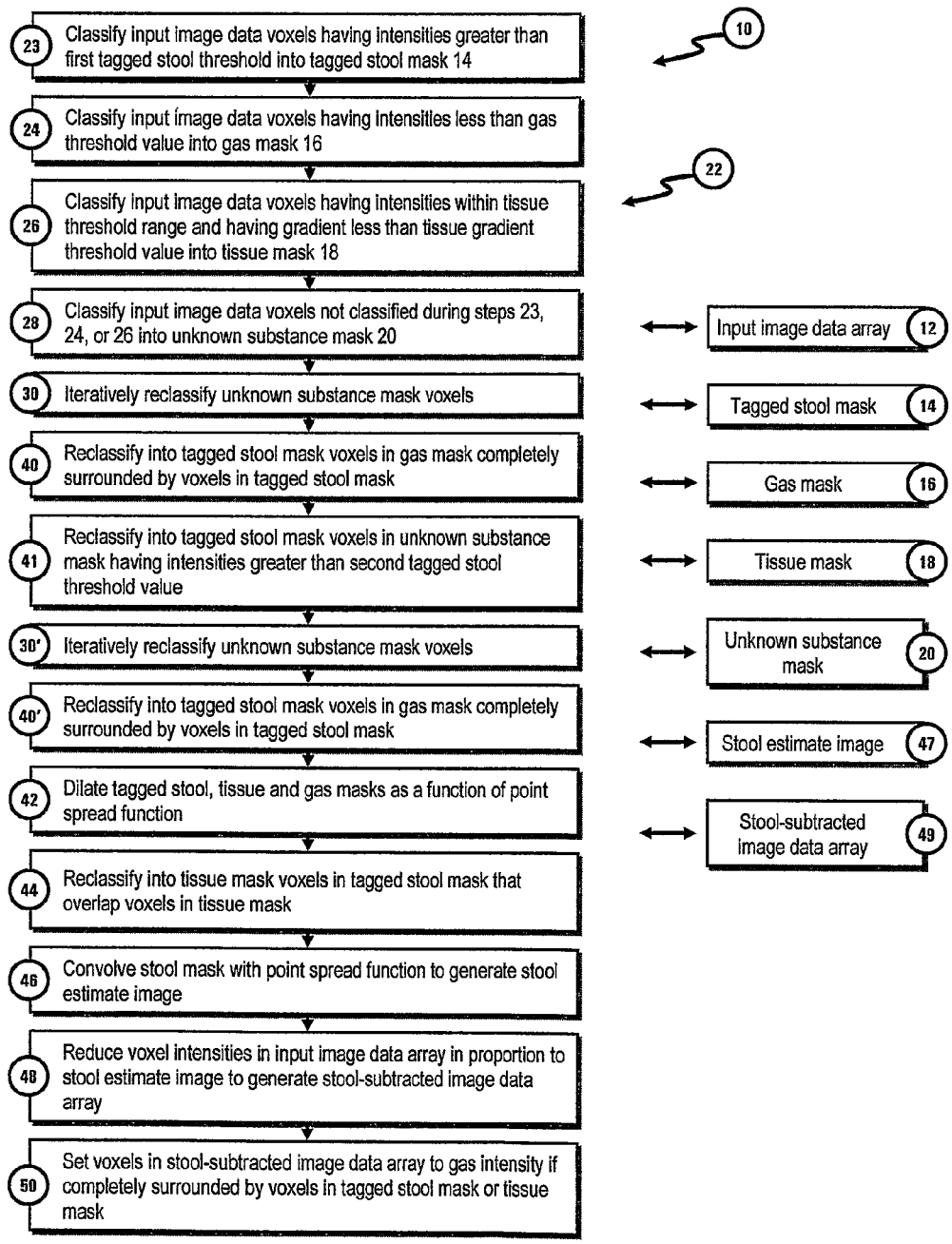
FIG. 1 is a flow diagram illustrating the steps of the electronic stool subtraction method in accordance with one embodiment of the invention.

FIG. 1 is a flow diagram illustrating the electronic stool subtraction method 10 of the present invention. The data processing operations of method 10 can be performed by a conventional computer system (not shown). The method is performed on an array of input image data 12 representative of a 3-dimensional image of a colon. Input image data array 12 includes data representative of the intensity of the image at each location or voxel in the image. In one embodiment of the invention the voxel data uses the Houndsfield scale to represent the range of voxel intensities. On the Houndsfield scale a value of −1000 houndsfield units (HU) is used to represent the density of air and a value of 0 HU is used to represent water. Bone will generally have densities corresponding to between 500 and 1000 HU.

Conventional low dose (e.g., 50 mAs) CT colonography was performed with 1.25 mm collimation and 1.25 mm reconstruction intervals to generate the image data array 12 used to develop the invention. The in-plane resolution ranged from 0.72 mm to 0.86 mm in this embodiment, with the majority of the images having a resolution of 0.78 mm. CT and other imaging systems used to generate image data processed in accordance with the present invention are characterized by a parameter known as the point spread function or psf. The psf is a quantitative estimate of the amount by which the intensity of a substance in one voxel affects the intensity of adjacent voxels. This parameter effectively corresponds to blur effects that are present in the image acquisition process. An estimate of the point spread function (psf) of the scanner used in the development of this invention was obtained using a phantom object with small (e.g., 0.25 mm) metal beads. The continuous psf was estimated to be Gaussian with standard deviation of 0.85 mm, and a discrete binary version of the psf was estimated from voxels with values greater than 0.05 as a 3×3×3 element with the eight corners removed (i.e., an eighteen-connected neighborhood). The estimates of the continuous psf and the discrete binary psf will vary between scanners, instrument settings, etc., and elements larger than 3×3×3 can also be used.

In one embodiment of the invention, the images were taken from patients that received eighteen grams of oral barium stool marker or tagging agent in equally divided doses over a forty-eight hour period prior to the imaging. No dietary restriction was required and no laxatives were administered. The images therefore typically include, in addition to the tissues of the colon and the air or other gas in empty portions of the colon, stool that is mixed with the stool marker to varying degrees (i.e., tagged stool).

Method 10 uses a number of voxel masks including tagged stool mask 14, air (or gas) mask 16, tissue mask 18 and unknown substance mask 20. Each mask 14, 16, 18 and 20 has data elements or voxels corresponding to each of the voxels in the input data array 12. The tagged stool mask 14 identifies corresponding voxels in the input image data array 12 that are determined by the method 10 to represent tagged stool in the image. The air mask 16 identifies corresponding voxels in the input image data array 12 that are determined by the method 10 to represent air in the image. Similarly, the tissue mask 18 identifies corresponding voxels in the input image data array 12 that are determined by the method 10 to represent colon tissues in the image. In the course of performing method 10 there will be voxels in the input image data array 12 that cannot (at least temporarily) be determined to be substances represented by the other masks. Accordingly, the unknown substance mask 20 identifies the corresponding voxels in the input image data array 12 that represent these unknown substances. By way of example, the data elements in the masks 14, 16, 18 and 20 can be marked with a digital "1" or "0" to identify the presence or absence, respectively, of the associated substance or unknown substance in the corresponding voxels in the image data array 12. As used in this document, the term "marked voxel" means a voxel in one of masks 14, 16, 18 or 20 that has been classified as being representative of or having the associated substance (e.g., a voxel marked with a digital "1" in the tagged stool mask designates the presence of stool at that voxel location). Similarly, the term "unmarked voxel" means a voxel in one of masks 14, 16, 18 or 20 that has not been classified as being representative of or having the associated substance.

The data processing of method 10 essentially begins with a classification process 22. Classification process 22 begins by initially creating the masks 14, 16, 18 and 20 as a function of the intensity and intensity gradient of the voxels in the input image data array 12. In one embodiment, voxels having intensities greater than or equal to a first tagged stool threshold value such as +200 HU are classified into the tagged stool mask 14 (e.g., the voxels in the tagged stool mask 14 corresponding to voxels in the input image data array 12 having intensities greater than or equal to +200 HU are set to a digital "1" (step 23). Voxels having intensities less than an air threshold value such as −900 HU are classified into the air mask 16 (step 24). Voxels having intensities within a tissue threshold range such as −200 HU and +50 HU, and also having gradients less than or equal to a tissue gradient threshold value such as 200, are classified into the tissue mask 18 (step 26). Voxels from input image data array 12 that are not initially classified into one of masks 14, 16 or 18 during steps 23, 24, or 26 are classified into the unknown substance mask 20 as shown by step 28.

The intensity gradient used to initially classify voxels from input image data array 12 into the tissue mask 18 during step 26 enhances the ability of the classification process 22 to distinguish voxels representative of tissue from voxels representative or air and/or stool located at an air-stool boundary that have intensities similar to those of tissue. One method used to calculate the gradient of the voxels in the image data array 12 makes use of six equally-spaced voxels immediately adjacent to and surrounding the voxels being categorized. Opposite pairs of voxels on the top and bottom, front and back and left and right sides of the voxel being categorized can, for example be used. Conventional computational approaches for computing the gradient from these voxels can also be used. For example, the difference in intensities between each of the opposite pairs can be computed. The square root of the sum of the squares of the differences can then be computed and used as the gradient that is compared to the tissue gradient threshold. Other approaches for computing the gradient between a voxel being classified and voxels representing adjacent image structures can also be used.

The classification process 22 continues with an iterative reclassification process 30. During the reclassification process 30 the method 10 essentially attempts to reclassify voxels in the unknown substance mask 20 as a function of the classification of adjacent or surrounding voxels. In one embodiment, this reclassification is made on the basis of the classifications of the twenty six voxels that surround and are immediately adjacent to the voxel that is the subject of the reclassification attempt.

Figure 2:
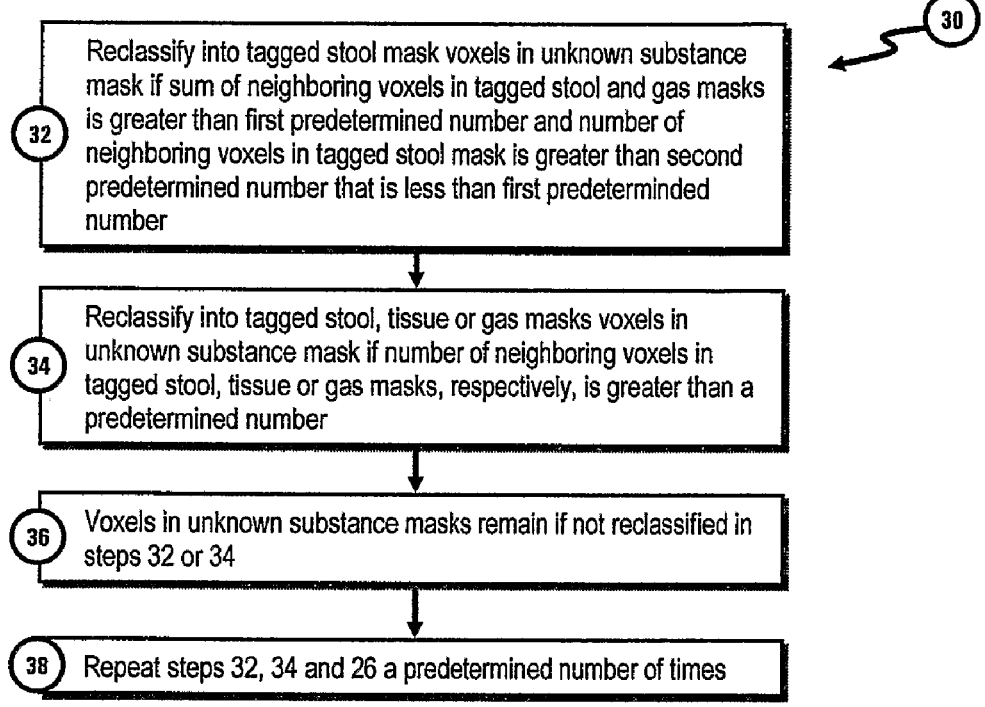
FIG. 2 is a detailed flow diagram of the iterative reclassification process step shown in FIG. 1.

FIG. 2 is a flow diagram illustrating the steps 32, 34 and 36 of one embodiment of the iterative reclassification process 30. The first decision rule applied in this embodiment of reclassification process 30 is based on surrounding voxels in both the tagged stool mask 14 and the air mask 16. As shown at step 32, the if the sum of the surrounding voxels in the tagged stool mask 14 and the air mask 16 is greater than a first predetermined number such as twenty and the number of voxels in the tagged stool mask is greater than a second predetermined number such as four, the voxel in the unknown mask 20 is reclassified into the tagged stool mask (i.e., the corresponding voxel in tagged stool mask is set to digital "1" and the corresponding voxel in the unknown material mask is set to digital "0"). A second step 34 in the reclassification process 30 of this embodiment is based the number of surrounding voxels in each of the tagged stool mask 14, air mask 16 and tissue mask 18. In particular, during step 34 if it is determined that the number of surrounding voxels in any of the tagged stool mask 14, air mask 16 and tissue mask 18 is greater than a predetermined number such as thirteen, the voxel in the unknown material mask 20 is reclassified into that mask. In the last step 36 of the described embodiment of reclassification process 30, the voxels in the unknown substance mask 20 remain unclassified if they were not reclassified by steps 32 and 34. As shown at step 38, the reclassification process 30 is then iterated by repeating steps 32, 34 and 36, in sequence, a predetermined number of times (seven times in one embodiment).

As shown in FIG. 1, a morphologic step 40 is performed following the completion of the iterative reclassification step 30. During step 40, all voxels in the air mask 16 that are completely surrounded by voxels in the tagged stool mask 14 are reclassified into the tagged stool mask. In effect, air holes in the tagged stool mask 14 are filled by morphologic step 40.

During the development of the invention it has been determined that areas of heterogeneous stool can still be represented in the unknown substance mask 20 following the completion of step 40 in the embodiment of the method described above. To accurately capture these areas, remaining voxels in the unknown stool mask 20 are reclassified into the tagged stool mask 14 as a function of their intensities at thresholding step 41. In one embodiment, the voxels in the unknown substance mask 20 are reclassified into the tagged stool mask 14 if they have an intensity greater than or equal to a predetermined threshold value such as +135 HU. The threshold value used in this step 41 is a lower value than the first tagged stool threshold value used in step 23.

An iterative reclassification step 30' is performed on the voxels in the unknown substance mask 20 following the thresholding step 41. During the iterative reclassification step 30' the method 10 again attempts to reclassify voxels in the unknown substance mask 20 as a function of the classification of adjacent or surrounding voxels. In one embodiment, reclassification process 30' is similar to reclassification process 30 in that it sequentially applies the decision rules of steps 32, 34, 36 and 38 to the voxels of the unknown substance mask 14. However, in this embodiment of reclassification step 30', the steps 32, 34, 36 and 38 are iterated or repeated a fewer number of times than in step 30. In one embodiment of reclassification step 30', steps 32, 34, 36 and 38 are repeated three times.

Another morphologic step 40' is performed following the iterative reclassification step 30'. In one embodiment of the invention the morphologic step 40' is substantially identical to the earlier-preformed morphological step 40.

Electronic stool subtraction method 10 continues with dilation step 42. During dilation step 42, tagged stool mask 14, air mask 16 and tissue mask 18 are dilated as a function of the psf of the instrument used to generate the input image data array 12. A structuring element generated as a function of the psf can be used for this purpose. In the embodiment of the invention described herein, based on the nature of the psf described above, it was empirically determined that dilation based on a psf structuring element in the form of eighteen neighboring voxels (e.g., a 3×3×3 voxel cube without the eight corner voxels removed) provided appropriate compensation for the blurring effects of the imaging instrument. The dilation step 42 performed in this embodiment of the invention can be analogized to the following process. The center voxel of the structuring element is located on every marked voxel in the tagged stool mask 14, air mask 16 and tissue mask 18 that is adjacent to an unmarked voxel (i.e., on the marked voxel edges of the masks). With the structuring element at each of these voxels, any unmarked voxels in the tagged stool mask 14, air mask 16 and tissue mask 18 at locations corresponding to those of the structuring element that are unmarked are reclassified as marked voxels. Other approaches for performing the dilation function, including other sizes and configurations of structuring elements, can also be used.

Dilation step 42 is performed on the basis that if a voxel appears to be entirely one type of substance, the actual distribution of that substance must extend beyond that voxel by an amount related to the psf. In theory, if the masks were created correctly, and if the structuring element was modeled correctly, the marked voxels in the dilated tagged stool mask 14, air mask 16 and tissue mask 18 would not intersect. However, due to the difficulties of classifying each substance type and the inexact nature of the structuring element, images are likely to have places where the masks 14, 16 and 18 overlap. Since in this embodiment of the invention an area of concern is areas common to the tagged stool mask 14 and the tissue mask 18, method 10 processes these masks by essentially assuming that any overlapping marked voxels represent tissue. Accordingly, marked voxels in the tagged stool mask 14 that overlap with marked voxels in the tissue mask 18 are reclassified as unmarked voxels (e.g., the overlapping voxels in the marked stool mask are set to a digital "0"). This step is shown at 44 in FIG. 1. Processing step 44 has demonstrated good results during the development of the invention. Possible reasons include: (1) the unclassified voxels have only fractional amounts of tagged stool due to the partial volume and system blurring effects, (2) the voxels belong to areas of poorly tagged stool, and (3) the voxels belong to thin folds in the colon whose gradient is too high to be classified as tissue.

The tagged stool mask 14 is then convolved with an estimate of the imaging instrument psf at step 46 to produce a fractional stool estimate image 47 containing data representative of an estimate of the fractional contribution of stool to the intensity value at each voxel in the image or input image data array 12. After being convolved in this matter, the stool estimate image 47 will include for each voxel in the input image 12 an estimated stool fraction number (e.g., 0<=p<=1) representative of the fractional contribution of stool to the intensity in that voxel. The convolution step 46 performed in one embodiment of the invention can be analogized to the following process. The psf is empirically determined to be represented by a twenty seven member cube (e.g., a 3×3×3 voxel cube). Each voxel of the cube is assigned a fractional number between one and zero representing the psf over the space of the cube. In one embodiment used to develop the invention, the center voxel of the cube is assigned the number one, and the surrounding cubes are assigned fractional numbers representing a Gaussian distribution with σ=0.85 mm. These numbers are then normalized by calculating their sum and dividing each number by that sum, so if these normalized numbers are added together the resulting sum is unity. The psf cube is then moved through the tagged stool mask 14 with the center voxel of the psf cube effectively being sequentially located at each voxel in the tagged stool mask. At each of these locations the numbers in all twenty seven voxels of the psf cube are multiplied by the digital "0" or "1" in the corresponding voxels in the tagged stool mask to generate twenty seven products. The twenty seven products are then added together to generate a sum that is then stored as the estimated stool fraction number in the voxel of the stool estimate image 47 corresponding to the location of the center voxel of the psf cube.

The stool estimate image 47 generated at convolution step 46 is then used to reduce the voxel intensities in the input image data array 12 and thereby essentially subtract the stool from the image (step 48). The data processing of step 48 produces a stool-subtracted image data array 49. In one embodiment of the invention the voxel intensities in the input image data array 12 are reduced by an amount proportional to the associated estimated stool fraction number for the voxel. The intensities of voxels in the input image data array 12 that do not have any stool present and remain in the same in the stool-subtracted image data array 49 (e.g., marked voxels in the air mask 16 and tissue mask 18) are not changed. Using the stool estimate image 47 the interval [0,1] is mapped onto the interval $[I_{orig}, -1000]$, where $I_{orig}$ is the voxel intensity in the input image data array 12. In one embodiment the linear mapping function of Equation 1 below is used for this purpose, where p is the estimated stool fraction number for the voxel and $I_{new}$ is the voxel intensity in the stool-subtracted image data array 49. The approach represented by Equation 1 effectively results in the estimated stool fraction number being used to proportionally map each voxel intensity in the input image data array 12 to a new intensity between the original intensity and an intensity of −1000 HU (e.g., if the estimated stool fraction number is 0.5, the new intensity is an intensity halfway between the original intensity and −1000 HU).

$$I_{new}=p(-1000-I_{orig})+I_{orig} \qquad \text{Eq. 1}$$

In another embodiment, to enhance the accuracy of the reduction of the intensities of voxels that are partly stool, the intensity of tagged stool can be known or estimated, and this can differ from patient to patient and across any given data set as the tagging effectiveness varies in different regions of the colon. In one embodiment of the invention, an estimate of the local stool density is obtained at each voxel by searching for the highest intensity in some spatial neighborhood around it (e.g., in a 5×5×5 or 5×5×3 voxel cube neighborhood). Since voxels that are fractionally stool are likely to be near voxels that are fully stool, this approach has been determined to provide a reasonable estimate. The intensity at each voxel is then reduced in this embodiment of the invention according to Equation 2 below:

$$I_{new}=I_{orig}-p(1000+\text{local stool density estimate}) \qquad \text{Eq. 2}$$

This approach effectively calculates the intensity that would result if the fraction of stool present in the voxel was replaced with air. Other approaches, including nonlinear mapping approaches, can also be used to reduce the intensity of voxels to effectively subtract stool from the images.

A morphologic step 50 is performed on the stool-subtracted image data array 49 following the stool subtraction step 48. During the morphologic step 50, all substances within the lumen of the colon that are completely surrounded by air (e.g., areas of poorly tagged stool) are effectively removed from the image. This processing can be done by setting to the intensity of air any voxels in the stool-subtracted image data array 49 that are completely surrounded by air (e.g., marked voxels in the tagged stool mask 14 or the tissue mask 18 that correspond to voxels that are completely surrounded by marked voxels in the air mask 16).

The stool-subtracted image data array 49 can then be used in a conventional manner to generate a series of CT images of adjacent slices of the colon. These images can be studied by a radiologist to identify polyps.

Tests have demonstrated that the electronic stool subtraction method 10 can accurately identify and remove residual stool and fluid image portions from colonography images, especially on relatively large areas of well-tagged stool. The iterative classifier captures areas of moderately heterogeneous or poorly tagged stool. Halos at the stool-air interface are virtually non-existent. In areas where stool was adjacent to tissue, the transition from tissue to air appears natural and realistic in the images. FIGS. 3A and 3B and 4A and 4B are examples of images of portions of a colon both before and after the removal of residual stool using the method of the invention. The method can also be efficiently implemented and performed on commercially-available data processing systems. These advantages are provided at least in part because of the use of the imaging instrument's psf to accurately estimate the fraction of stool present in each voxel. The stool removal process also estimates partial volume and system blur effects for each voxel by attempting to emulate aspects of the image acquisition process through the use of the psf.

Although the invention has been described with reference to preferred embodiments, those skilled in the art will recognize that changes can be made in form and detail without departing from the spirit and scope of the invention. In particular, although the individual steps of the invention have been described in a specific order, these steps can be performed in other orders, and one or more individual steps can be omitted. Variations on individual steps, such as different thresholds and numbers, are also contemplated. Although described in connection with colonography, the invention can be used to process images of other body structures as well. Although certain processing steps are described in certain orders in the claims, other or additional processing steps can be performed between the ordered steps.

What is claimed is:

1. A method for processing input image voxel data representative of 3-dimensional images of a colon having gas and stool tagged with stool tagging agent and generated by an imaging instrument having a point spread function, to remove the stool from the images, including:
   a. classifying the voxels into one of a plurality of class masks including tagged stool, gas, tissue and unknown substance masks as a function of the intensities and gradients of the voxels;
   b. attempting to reclassify at least some of the voxels in the unknown substance mask into one or more of the tagged stool, gas and tissue masks as a function of the classification of adjacent voxels;
   c. after step b, attempting to reclassify at least some of the voxels in the unknown substance mask into the tagged stool mask if the voxels in the unknown substance mask are surrounded by voxels in the tagged stool mask;
   d. after step c, attempting to reclassify at least some of the voxels in the unknown substance mask into the tagged stool mask as a function of the intensities of the voxels in the unknown substance mask;
   e. after step d, repeating step b;
   f. after step e, repeating step c;
   g. after step f, dilating the tagged stool, gas and tissue masks as a function of the point spread function of the instrument;
   h. after step g, reclassifying voxels of the tagged stool mask that overlap with voxels in the tissue mask into the tissue mask;
   i. after step h, convolving voxels in the tagged stool mask with the point spread function of the instrument to generate an estimate of the fractional contribution of stool to the intensity at voxels in the input image voxel data; and
   j. reducing the intensities of voxels in the input image voxel data as a function of the stool amount estimates generated in step i.

2. The method of claim 1 wherein step b is iteratively repeated more than one time before performing step c.

3. The method of claim 1 wherein step b includes reclassifying voxels in the unknown substance mask into the tagged stool mask as a function of the number of adjacent voxels that are in the tagged stool and gas masks.

4. The method of claim 3 wherein step b includes reclassifying voxels in the unknown substance mask into the tagged stool mask if the number of adjacent voxels in the tagged stool and gas masks is greater than a first number and the number of adjacent voxels in the tagged stool mask is greater than a second number that is less than the first number.

5. The method of claim 1 wherein step b includes reclassifying voxels in the unknown substance mask into the tagged stool mask as a function of the number of adjacent voxels that are in the tagged stool mask.

6. The method of claim 1 wherein step b includes reclassifying voxels in the unknown substance mask into the gas mask as a function of the number of adjacent voxels that are in the gas mask.

7. The method of claim 1 wherein step b includes reclassifying voxels in the unknown substance mask into the tissue mask as a function of the number of adjacent voxels that are in the tissue mask.

8. The method of claim 1 wherein:
   step a includes reclassifying voxels from the unknown substance mask into the tagged stool mask if the voxels have an intensity greater than a first intensity threshold; and
   step d includes reclassifying voxels from the unknown substance mask into the tagged stool mask if the voxels have an intensity greater than a second intensity threshold that is less than the first intensity threshold.

9. The method of claim 1 wherein step e is iteratively repeated more than one time before performing step f.

10. The method of claim 1 wherein step g includes dilating the tagged stool, gas and tissue masks using a structuring element having a size determined as a function of the point spread function of the imaging instrument.

11. The method of claim 1 wherein step j includes linearly reducing the intensities of voxels of the input image voxel data as a function of the stool amount estimates generated in step i.

12. The method of claim 1 wherein step j includes proportionally mapping the intensities of the input image data to new intensities between the original intensities and an intensity threshold value representative of gas.

13. The method of claim 1 wherein step a includes classifying voxels having intensities greater than a tagged stool threshold value into the tagged stool mask.

14. The method of claim 1 wherein step a includes classifying voxels having intensities less than a gas threshold value into the gas mask.

15. The method of claim 1 wherein step a includes classifying voxels having intensities between first and second tissue threshold range values and a gradient less than a tissue gradient threshold value into the tissue mask.

16. The method claim 1 wherein step a includes:
   classifying voxels having intensities less than a gas threshold value representative of gas into the gas mask;
   classifying voxels having intensities greater than a tagged stool threshold value representative of tagged stool into the tagged stool mask;
   classifying voxels having intensities between tissue threshold range values and gradients less than a tissue gradient threshold value into the tissue mask, wherein the tissue threshold range values are greater than the gas threshold value and less than the tagged stool threshold value.

17. The method of claim 1 wherein step j includes reducing the intensities of voxels of the input image data as a function of the stool amount estimates generated in step i and an estimate of the intensity of the tagged stool.

18. The method of claim 17 and further including generating the tagged stool intensity estimate as a function of the intensity of neighboring voxels in the tagged stool mask.

19. A method for processing input image voxel data generated by an imaging instrument having a point spread function and representative of 3-dimensional images of a colon having gas and stool tagged with stool tagging agent to remove the stool from the images, including processing the image voxel data as a function of the point spread function of the imaging instrument.

20. The method of claim 19 and further including estimating the point spread function of the imaging instrument.

21. The method of claim 20 wherein estimating the point spread function includes empirically determining or theoretically calculating the point spread function of the imaging instrument.

22. The method of claim 19 wherein processing the data includes dilating portions of the image data representative of tagged stool and/or gas as a function of the point spread function.

23. The method of claim 19 wherein processing the data includes reducing intensities of voxel data representative of tagged stool as a function of the point spread function.

24. The method of claim 20 wherein processing the data includes convolving portions of the image data representative of tagged stool with the point spread function.

* * * * *